United States Patent
Zettler (10) Patent No.: US 10,144,071 B2
(45) Date of Patent: Dec. 4, 2018

(54) TOOL HOLDER HAVING POSITION ADJUSTMENT ARRANGEMENT AND CUTTING TOOL

(71) Applicant: Iscar, Ltd., Tefen (IL)

(72) Inventor: Martin Zettler, Bietigheim-Bissingen (DE)

(73) Assignee: Iscar, Ltd., Tefen (IL)

( * ) Notice: Subject to any disclaimer, the term of this patent is extended or adjusted under 35 U.S.C. 154(b) by 160 days.

(21) Appl. No.: 15/460,413

(22) Filed: Mar. 16, 2017

(65) Prior Publication Data

US 2018/0264562 A1    Sep. 20, 2018

(51) Int. Cl.
*B23C 5/00* (2006.01)
*B23C 5/24* (2006.01)
*B23C 5/06* (2006.01)

(52) U.S. Cl.
CPC .............. *B23C 5/2472* (2013.01); *B23C 5/06* (2013.01); *B23C 5/242* (2013.01); *B23C 2210/16* (2013.01); *B23C 2240/24* (2013.01)

(58) Field of Classification Search
CPC ... B23C 5/2278; B23C 5/2265; B23C 5/2269; B23C 5/2403; B23C 5/2437; B23B 2260/146
See application file for complete search history.

(56) References Cited

U.S. PATENT DOCUMENTS 3,217,384 A * 11/1965 Wirfelt .................. B23C 5/2278
407/113

3,242,553 A 3/1966 Bogsten
3,711,216 A 1/1973 Zurcher
(Continued)

FOREIGN PATENT DOCUMENTS

| DE | 10340052 A1 | 5/2005 |
|---|---|---|
| DE | 202015102712 U1 | 6/2015 |
| JP | 2010-131739 A | 6/2010 |

OTHER PUBLICATIONS

International Search Report dated Jun. 26, 2018, issued in PCT counterpart application (No. PCT/IL2018/050185).

(Continued)

*Primary Examiner* — Will Fridie, Jr.
(74) *Attorney, Agent, or Firm* — Womble Bond Dickinson (US) LLP (57) ABSTRACT

A cutting tool includes a tool holder, having a holder pocket with a pocket opening, and a cutting member releasably retained therein. The tool holder includes an adjustment cavity that includes circumferentially merging threaded and guiding bore portions. The tool holder further includes an adjustment arrangement that includes an adjustment member including a wedge adjustment portion and a guiding portion integrally formed therewith. The adjusting arrangement further includes an adjustment screw. The wedge adjustment portion is located in the pocket adjustment region and the guiding portion is located in the guiding bore portion and partially protrudes into the threaded bore portion. The adjustment screw is threadingly rotatable between a first rotated position and a second rotated position, and in the second rotated position the adjustment member, and thus the cutting member, is located closer to the pocket opening than in the first rotated position.

28 Claims, 5 Drawing Sheets

(56) References Cited

U.S. PATENT DOCUMENTS

| | | | |
|---|---|---|---|
| 4,311,418 A * | 1/1982 | Erkfritz | B23C 5/2444 407/36 |
| 4,623,284 A | 11/1986 | Greiff | |
| 5,217,330 A | 6/1993 | Dennstedt | |
| 5,478,178 A | 12/1995 | Pawlick | |
| 6,030,153 A | 2/2000 | Votsch et al. | |
| 6,056,484 A * | 5/2000 | Mitchell | B23C 5/2493 407/36 |
| 8,092,124 B2 * | 1/2012 | Spichtinger | B23C 5/006 407/11 |
| 9,296,045 B2 | 3/2016 | Matheis | |
| 2005/0047876 A1 | 3/2005 | Schaupp et al. | |
| 2007/0283786 A1 | 12/2007 | Kappmeyer | |
| 2013/0330136 A1 * | 12/2013 | Hecht | B23C 5/2221 407/113 |
| 2014/0086696 A1 * | 3/2014 | Fang | B23C 5/2221 407/99 |
| 2014/0212226 A1 * | 7/2014 | Saji | B23C 5/06 407/33 |

OTHER PUBLICATIONS

Written Opinion dated Jun. 26, 2018, issued in PCT counterpart application (No. PCT/IL2018/050185).

* cited by examiner

TOOL HOLDER HAVING POSITION ADJUSTMENT ARRANGEMENT AND CUTTING TOOL

FIELD OF THE INVENTION

The subject matter of the present application relates to cutting tools having at least one holder pocket and a cutting member releasably retained therein, in general, and to such cutting tools with adjustment arrangements for adjusting the position of the cutting member, in particular.

BACKGROUND OF THE INVENTION

Cutting tools, having a tool holder having at least one holder pocket with a cutting member releasably retained therein, can be provided with an adjustment mechanism for adjusting the position of said cutting member, relative to the tool holder.

Some such cutting tools have a tool holder that is movable and can be suitable for rotary cutting operations (e.g. milling or drilling). Examples of such cutting tools, where the positional adjustment is in the axial direction are disclosed in, for example, U.S. Pat. No. 4,623,284, U.S. Pat. No. 6,030,153, U.S. Pat. No. 6,056,484 and U.S. Pat. No. 8,092,124. Another example, where the positional adjustment is in the radial direction is disclosed in, for example, U.S. Pat. No. 9,296,045 B2.

Other such cutting tools have a tool holder that is fixedly mounted and can be suitable for non-rotary cutting operations (e.g. turning). An example of one such cutting tool, where the positional adjustment is in the radial direction is disclosed in, for example, U.S. Pat. No. 5,217,330.

SUMMARY OF THE INVENTION

In accordance with a first aspect of the subject matter of the present application there is provided a tool holder, having a holder central axis defining opposite forward and rearward directions, the tool holder comprising:

a holder face surface and a holder peripheral surface extending rearwardly and circumferentially along the holder central axis from the holder face surface;

a holder pocket recessed in the tool holder and comprising a pocket opening which opens out to one of the holder peripheral surface and holder face surface, and further comprising a pocket adjustment region located at an opposing end of holder pocket to the pocket opening;

an adjustment cavity, recessed in and opening out to whichever one of the holder peripheral surface and holder face surface the pocket opening does not open out to, the adjustment cavity comprising circumferentially merging threaded and guiding bore portions, the guiding bore portion adjoining the pocket adjustment region.

In accordance with a second aspect of the subject matter of the present application there is provided a cutting tool comprising:

a tool holder of the type described above; and
a cutting member releasably retained in the holder pocket.

It is understood that the above-said is a summary, and that features described hereinafter may be applicable in any combination to the subject matter of the present application, for example, any of the following features may be applicable to the tool holder or the cutting tool:

The tool holder can further comprise:
an adjustment arrangement comprising:
an adjustment member comprising a wedge adjustment portion and a guiding portion integrally formed therewith, the guiding portion comprising an actuating groove; and
an adjustment screw comprising an adjustment screw head; wherein
the wedge adjustment portion can be located in the pocket adjustment region;
the guiding portion can be located in the guiding bore portion and partially protrudes into the threaded bore portion so that the actuating groove is located therein;
the adjustment screw can be threadingly received in the threaded bore portion;
the adjustment screw head can be located in the actuating groove; and
the adjustment screw can be threadingly rotatable between a first rotated position and a second rotated position, and in the first rotated position the adjustment member can be located closer to the pocket opening than in the second rotated position.

The guiding portion can comprise two opposing guiding portion end surfaces and a guiding portion peripheral surface extending therebetween. The guiding portion peripheral surface can extend circumferentially along an adjustment arrangement major axis that intersects the two guiding portion end surfaces. The actuating groove can be recessed in the guiding portion peripheral surface.

The actuating groove can comprise first and second groove side surfaces which can face each other and can be spaced apart by a concavely curved groove central surface.

As measured in the direction of the adjustment arrangement major axis, a groove width of the actuating groove can be greater than 50% of a guiding portion length of the guiding portion.

The guiding portion has a shape that can correspond to the guiding bore portion.

The wedge adjustment portion can comprise two opposing wedge end surfaces and a wedge peripheral surface extending therebetween. The wedge peripheral surface can comprise:

opposing wedge rear and forward contact surfaces, and opposing a wedge top and bottom surfaces. The wedge top surface can connect the wedge rear and front contact surfaces. The wedge rear contact surface can connect the wedge top surface and the guiding portion peripheral surface. The wedge bottom surface can connect the wedge front contact surface and the guiding portion peripheral surface.

The wedge adjustment portion can be integrally formed with the guiding portion at a guiding neck portion that is narrower than the guiding portion.

The wedge front contact surface can face towards the pocket opening, can be planar and can be perpendicular to the holder central axis.

The wedge front contact surface and the wedge rear contact surface can taper towards each other at an acute wedge angle.

The wedge front contact surface and the wedge rear contact surface can taper towards each other in a direction away from whichever one of the holder peripheral surface and holder face surface the pocket opening does not open out to.

The adjustment member can be made from a metal by an additive manufacturing process, and therefore comprises an additively manufactured metallic unit.

The guiding bore portion can extend along a guiding bore portion axis. The threaded bore portion can extend along a threaded bore portion axis. The guiding bore portion axis can be parallel to the threaded bore portion axis and spaced apart therefrom.

The holder pocket can comprise a pocket base surface, and a pocket peripheral surface oriented substantially perpendicularly thereto and forming a partial boundary thereof. The pocket peripheral surface comprises a pocket support surface that can be planar and parallel to the guiding bore portion axis.

The guiding bore portion comprises a guiding bore portion peripheral surface that extends circumferentially along the guiding bore portion axis. The guiding bore portion peripheral surface can extend to a support edge of the pocket support surface. The guiding bore portion peripheral surface can extend to a base edge of the pocket base surface.

The holder pocket has an adjustment axis that can extend through the pocket adjustment region and the pocket opening, defining opposite first and second adjustment direction. In a view perpendicular to a pocket median plane, the guiding bore portion axis can be oriented obliquely with respect to the adjustment axis.

The guiding bore portion axis and the adjustment axis can form an obtuse guiding angle, the guiding angle being measured through the holder pocket.

The adjustment axis can be substantially parallel to the holder central axis.

The threaded bore portion extends along a threaded bore portion axis that can be parallel to the guiding bore portion axis and spaced apart therefrom.

In a plane perpendicular to the guiding bore portion axis, the guiding bore portion can have a constant guiding bore cross-section along the guiding bore portion axis.

The guiding bore cross-section can be circular.

The pocket opening can open out to the holder face surface. The adjustment cavity can be recessed in and open out to the holder peripheral surface.

The holder pocket can be located at a forward end of the tool holder.

The cutting member can comprise a cutting member through bore. The holder pocket can comprise a pocket threaded bore recessed in and opening out to the pocket base surface. The cutting member can releasably retained in the holder pocket by a retaining screw located in the cutting member through bore and threadingly received in the pocket threaded bore.

The cutting member can comprise a cutting edge and a cutting member bearing surface opposite the cutting edge. The cutting member bearing surface can abut the wedge front contact surface.

The pocket support surface can abut the wedge rear contact surface.

The cutting member can consist of an integral cutting insert.

The cutting tool can be rotatable about the tool central axis in a rotational direction.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
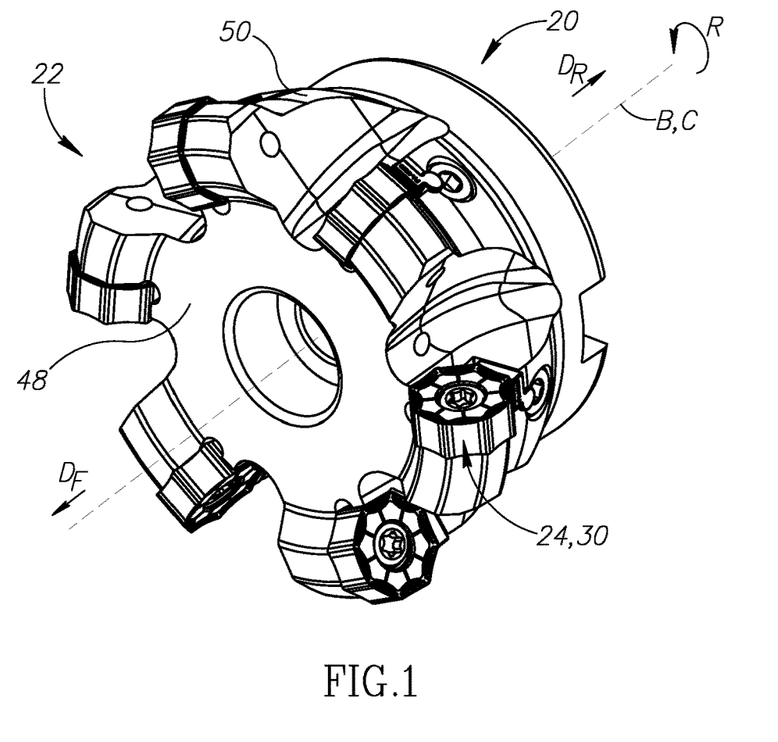
FIG. 1 is a perspective view of a cutting tool in accordance with a first embodiment of the present application.
Figure 2:
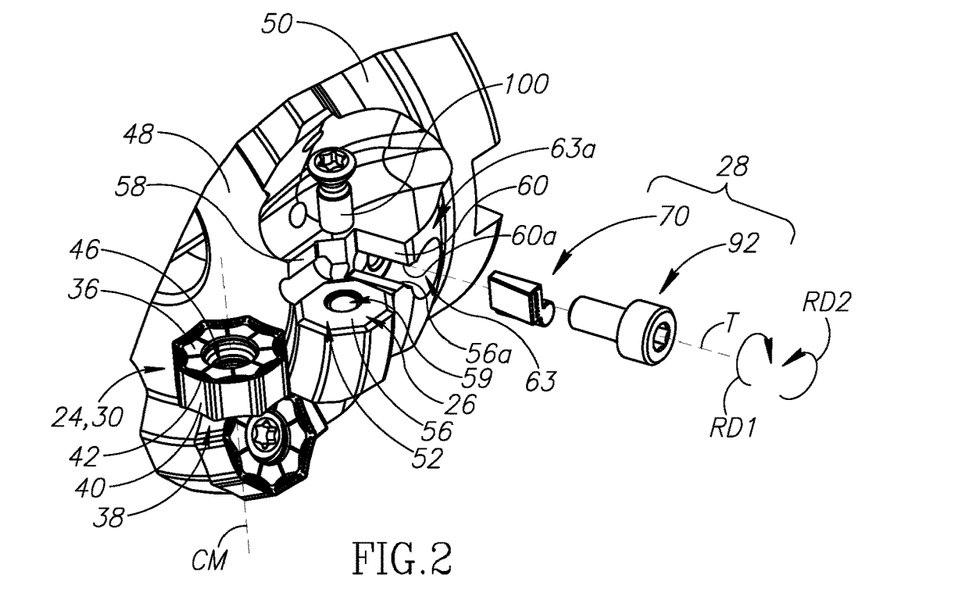
FIG. 2 is an exploded perspective view showing a holder pocket of the cutting tool shown in FIG. 1.

Attention is first drawn to FIGS. 1 and 2 showing a cutting tool 20, for chip removal, depicting an aspect of the present application. In this non-limiting example shown in the drawings, the cutting tool 20 is a rotary cutting tool. In particular, the rotary cutting tool is a milling cutter, suitable for milling cutting operations. However, the subject matter of the present application is not restricted only to milling cutters and could also be applicable to, for example but not limited to, drilling cutting tools. Moreover, the cutting tool 20 could be a non-rotary cutting tool, such as, but not limited to, a turning tool. The cutting tool 20 has a tool central axis C. In accordance with some embodiments of the subject matter of the present application, the cutting tool 20 can be rotatable in a rotational direction R about the tool central axis C. The cutting tool 20 has a tool holder 22 which can be typically made from steel. The cutting tool 20 also has at least one cutting member 24, releasably retained in at least one holder pocket 26 of the tool holder 22. The cutting member 24 is designed to perform metal cutting operations. The tool holder 22 has an adjustment arrangement 28 for adjusting the position of the cutting member 24, relative to the tool holder 22.

It should also further be noted that use of the terms "axial" and "radial" throughout the description and claims are with respect to the tool central axis C, unless otherwise stated.

Figures 3, 4:
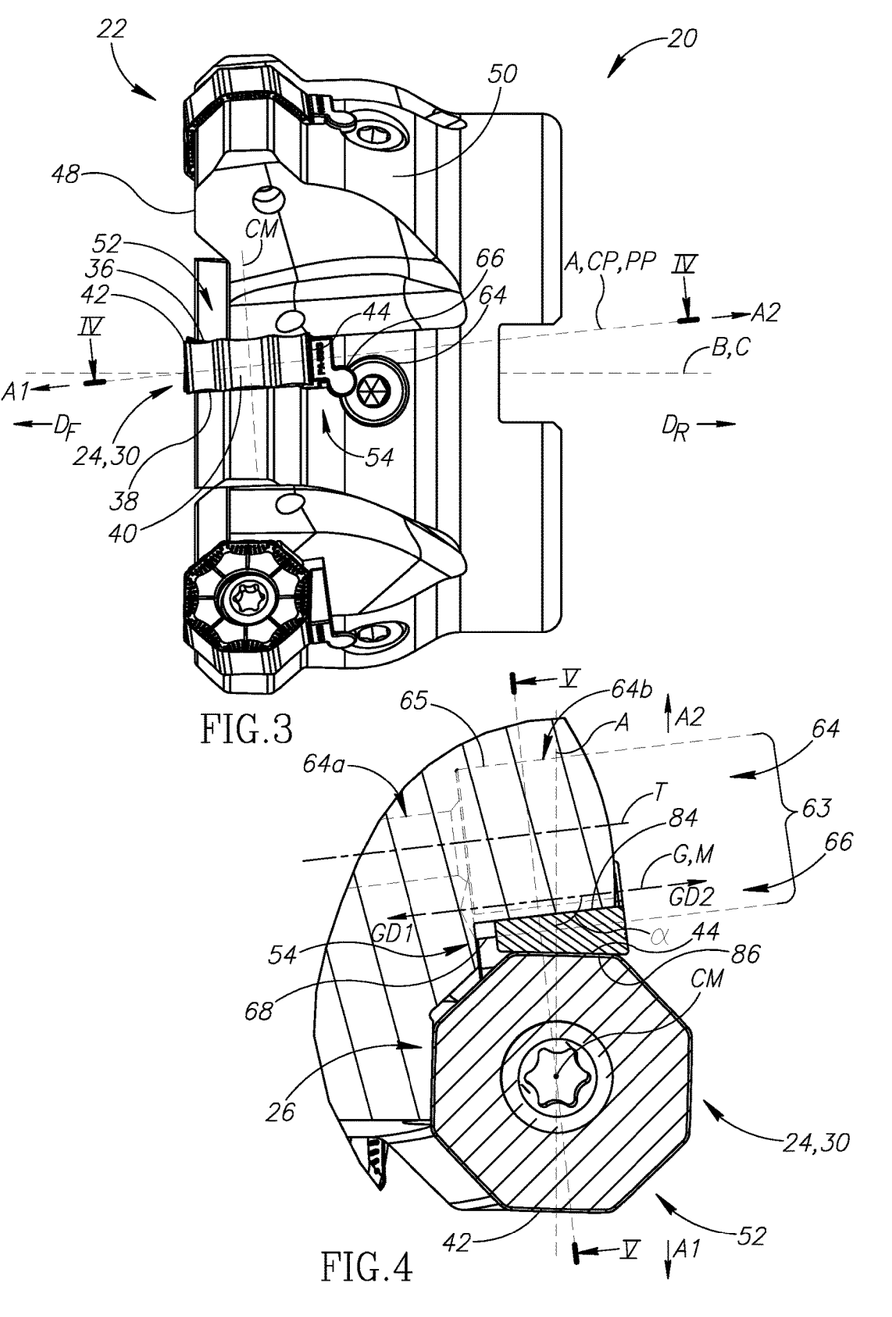
FIG. 3 is a side view of the cutting tool shown in FIG. 1.
FIG. 4 is a portion of a cross section view taken along line IV-IV shown in FIG. 3.

Reference is now made also to FIG. 3. In accordance with some embodiments of the subject matter of the present application, the cutting member 24 can consist of an integral cutting insert 30. That is to say, the cutting member 24 can be of unitary, one-piece construction. The cutting insert 30 can be typically made from cemented carbide, and may be coated or uncoated.

The cutting member 24 can include opposing cutting member top and bottom surfaces 36, 38 and a cutting member peripheral surface 40 that extends therebetween. The cutting member 24 has a cutting member central axis CM that extends through the cutting member top and bottom surfaces 36, 38. In accordance with some embodiments of the subject matter of the present application, the cutting member 24 can exhibit rotational symmetry about the cutting member central axis CM. In this non-limiting example shown in the drawings the cutting member 24 exhibits 8-fold rotational symmetry about the cutting member central axis CM. The cutting member 24 has a cutting member median plane CP that is perpendicular to the cutting member central axis CM and extends midway between the cutting member top and bottom surfaces 36, 38. The cutting member 24 can be single sided or double sided. When the cutting member 24 is double-sided, the cutting member 24 can exhibit mirror symmetry about the cutting member median plane CP.

The cutting member 24 includes a cutting edge 42 formed at a portion of the intersection of the cutting member top surface 36 and the cutting member peripheral surface 40. The cutting member peripheral surface 40 can include a cutting member bearing surface 44. The cutting member bearing surface 44 is designed for abutting a corresponding support surface of the adjustment arrangement 28. The cutting member bearing surface 44 is located opposite the cutting edge 42. In accordance with some embodiments of the subject matter of the present application, the cutting member 24 can include a cutting member through bore 46 that opens out to the cutting member top and bottom surfaces 36, 38. The cutting member through bore 46 can extend along the cutting member central axis CM.

Reference is now made in particular to FIGS. 1 and 3, showing the tool holder 22, depicting another aspect of the present application. The tool holder 22 has a holder central axis B. The holder central axis B defines opposite forward and rearward directions $D_F$, $D_R$. The holder central axis B is co-incident with the tool central axis C. The tool holder 22 can be rotatable about the holder central axis B in the rotational direction R. The tool holder 22 includes a holder face surface 48 and a holder peripheral surface 50. The holder peripheral surface 50 extends rearwardly and circumferentially along the holder central axis B from the holder face surface 48. The holder peripheral surface 50 forms a boundary of the holder face surface 48. The holder central axis B extends through said boundary.

It should also be noted that use of the terms "forward" and "rearward" throughout the description and claims refer to a relative position in a direction of the holder central axis B towards the left and right, respectively, in FIG. 3. In the present disclosure, "forward" is associated with the cutting end of the cutting tool 20.

Reference is now made in particular to FIG. 2. The tool holder 22 includes at least one holder pocket 26 for seating the cutting member 24. Reference hereinafter is made to a single one of the holder pockets 26. The holder pocket 26 is recessed in the tool holder 22. The holder pocket 26 includes a pocket opening 52 which opens out to one of the holder peripheral surface 50 and holder face surface 48. Specifically, when the adjustment arrangement 28 is for adjusting the axial position of the cutting member 24, the pocket opening 52 is considered to open out to the holder face surface 48. Alternatively, when the adjustment arrangement 28 is for adjusting the radial position of the cutting member 24, the pocket opening 52 is considered to open out to the holder peripheral surface 50. When seated in the holder pocket 26, the cutting edge 42 of the cutting member 24 is located at the pocket opening 52 so that the cutting edge 42 is permitted to contact the workpiece unimpeded when performing a cutting operation. In accordance with some embodiments of the subject matter of the present application, the holder pocket 26 can be located at a forward end of the tool holder 22. As best seen in FIG. 2, the holder pocket 26 can include a pocket base surface 56, and a pocket peripheral surface 58 oriented substantially perpendicularly thereto and forming a partial boundary thereof. The holder pocket 26 can include a pocket threaded bore 59. The pocket threaded bore 59 can be recessed in and open out to the pocket base surface 56. The pocket peripheral surface 58 can include a pocket support surface 60, for abutting a corresponding surface on a wedge adjustment portion 62 of the adjustment arrangement 28. The pocket support surface 60 can be planar. The holder pocket 26 has a pocket median plane PP that is parallel to the pocket base surface 56 and extends through (i.e. intersects) a mid-portion of the pocket support surface 60. The pocket median plane PP can be co-incident with the cutting member median plane CP when the cutting member 24 is seated in the holder pocket 26.

The holder pocket 26 includes a pocket adjustment region 54. The pocket adjustment region 54 is located at an opposing end to, and spaced apart from, the pocket opening 52. Thus, when the adjustment arrangement 28 is for adjusting the axial position of the cutting member 24, and the pocket opening 52 is considered to open out to the holder face surface 48, the pocket adjustment region 54 is located on an axially rearward side of the holder pocket 26. And when the adjustment arrangement 28 is for adjusting the radial position of the cutting member 24, and the pocket opening 52 is considered to open out to the holder peripheral surface 50, the pocket adjustment region 54 is located on a radially inward side of the holder pocket 26.

In accordance with some embodiments of the subject matter of the present application, the pocket adjustment region 54 can be defined between the pocket support surface 60 on one side and (when the cutting member 24 is seated in the holder pocket 26) by the cutting member bearing surface 44 on the other side. Stated differently, the adjustment region 54 defines a space for the wedge adjustment portion 62 to be displaced within, as described later in the description.

Referring now to FIGS. 3 and 4, the holder pocket 26 has an adjustment axis A that extends through the pocket adjustment region 54 and the pocket opening 52. More precisely, in some embodiments the adjustment axis A can be defined as extending parallel with the pocket base surface 56. The adjustment axis A defines opposite first and second adjustment direction A1, A2.

In accordance with some embodiments of the subject matter of the present application, the adjustment axis A can be contained in the pocket median plane PP. In a view perpendicular to the pocket median plane PP (i.e. FIG. 4), the adjustment axis A can be parallel to the holder central axis B. In such a configuration, the first and second adjustment directions A1, A2 are axial directions, and thus the adjustment arrangement 28 is applicable for axial adjustment of the cutting member 24. And in such case, the pocket opening 52 is said to open out to the holder face surface 48.

In accordance with some other embodiments of the subject matter of the present application, the adjustment axis A can be perpendicular to the holder central axis B. In this latter configuration (not shown), the first and second adjustment directions A1, A2 can be radial directions, and thus the adjustment arrangement 28 is applicable for radial adjustment of the cutting member 24. And in such case, the pocket opening 52 is said to open out to the holder peripheral surface 50.

Figure 5:
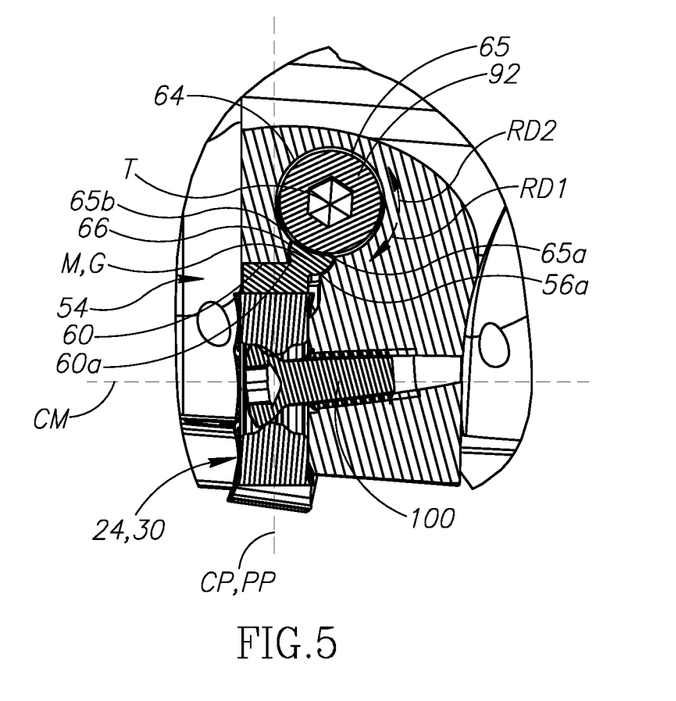
FIG. 5 is a cross section view taken along line V-V shown in FIG. 4.

Referring now to FIGS. 2, 3 and 5, the tool holder 22 includes an adjustment cavity 63. The adjustment cavity 63 is designed to accommodate corresponding parts of the adjustment arrangement 28, as described later in the description. The adjustment cavity 63 is recessed in the tool holder 22. The adjustment cavity 63 includes an adjustment cavity opening 63a that opens out to whichever one of the holder peripheral surface 50 and holder face surface 48 the pocket opening 52 does not open out to. That is to say, when the adjustment arrangement 28 is for adjusting the axial position of the cutting member 24, the adjustment cavity opening 63a opens out to the holder peripheral surface 50. Alternatively, when the adjustment arrangement 28 is for adjusting the radial position of the cutting member 24, the adjustment cavity opening 63a opens out to the holder face surface 48.

The adjustment cavity 63 includes a threaded bore portion 64 and a guiding bore portion 66. Referring now to FIGS. 4 and 5, in accordance with some embodiments of the subject matter of the present application, the guiding bore portion 66 can extend along a guiding bore portion axis G. The guiding bore portion axis G defines opposite first and second guiding directions GD1, GD2. The guiding bore portion 66 has a guiding bore portion peripheral surface 68 that can extend circumferentially along the guiding bore portion axis G. The guiding bore portion peripheral surface 68 can extend to the adjustment cavity opening 63a (see FIG. 2).

The guiding bore portion peripheral surface 68 extends to a support edge 60a of the pocket support surface 60. The pocket support surface 60 can be parallel to the guiding bore portion axis G.

The guiding bore portion 66 is adjacent the pocket adjustment region 54. Preferably, the guiding bore portion peripheral surface 68 also extends to a base edge 56a of the pocket base surface 56. Advantageously, in such a configuration the guiding bore portion 66 can dually provide the function of a stress relief groove for the holder pocket 26.

In accordance with some embodiments of the subject matter of the present application, the guiding bore portion 66 can have a constant guiding bore cross-section along the guiding bore portion axis G. The guiding bore cross-section can be circular. That is to the say, the guiding bore portion 66 can have a hollow cylindrical shape. In a view perpendicular to the pocket median plane PP (i.e. FIG. 4), the guiding bore portion axis G can be oriented obliquely (i.e. non-perpendicular and non-parallel) with respect to the adjustment axis A. In particular, the guiding bore portion axis G can slope towards the holder central axis B in the forward direction $D_F$ (or stated differently can slope in an inward and forward direction into the tool holder 22) so that in a view perpendicular to the pocket median plane PP, the guiding bore portion axis G and the adjustment axis A form an obtuse guiding angle $\alpha$, the guiding angle $\alpha$ being measured through the holder pocket 26. Preferably, the guiding angle $\alpha$ can be in the range $95° \leq \alpha \leq 100°$. Advantageously, this allows for fine adjustment of the location of the cutting member 24.

The threaded bore portion 64 can extend along a threaded bore portion axis T. The threaded bore portion 64 has a threaded bore portion peripheral surface 65 that can extend circumferentially along the threaded bore portion axis G. The threaded bore portion peripheral surface 65 can extend to the adjustment cavity opening 63a.

As shown in FIG. 5, the guiding bore portion peripheral surface 68 extends to first and second edges 65a, 65b of the threaded bore portion peripheral surface 65. Stated differently, the threaded bore portion 64 and the guiding bore portion 66 circumferentially merge. Thus, the adjustment cavity 63 can be non-circular. In accordance with some embodiments of the subject matter of the present application, the threaded bore portion axis T can be parallel to the guiding bore portion axis G and spaced apart therefrom. As seen in FIG. 4, the threaded bore portion 64 can include two distinct portions of differing diameters, namely a threaded portion 64a having an internal thread and a non-threaded screw head portion 64b, located adjacent the adjustment cavity opening 63a, for accommodating the head of a screw as described later in the description. Preferably, only the screw head portion 64b of the threaded bore portion 64 circumferentially merges with the guiding bore portion 66.

Figure 6:
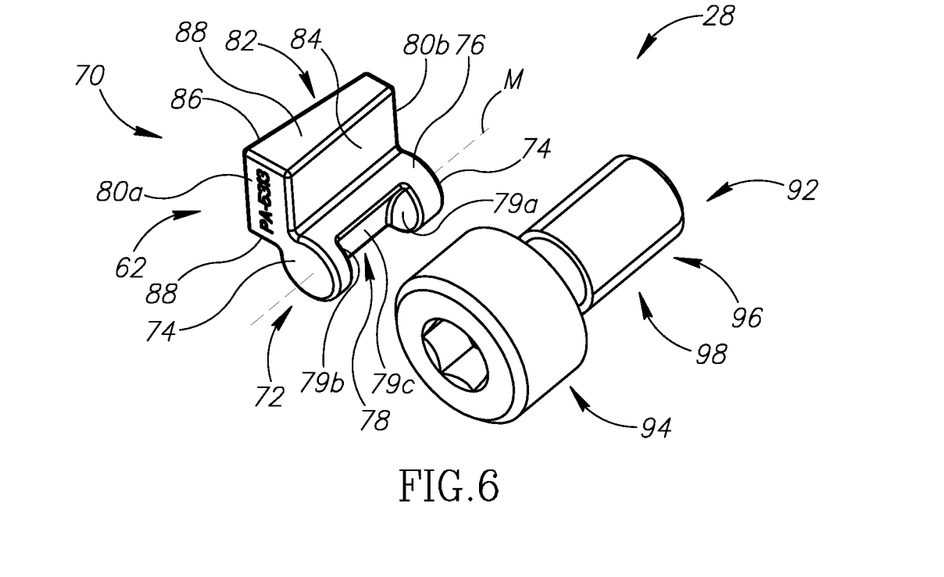
FIG. 6 is an exploded perspective view of an adjustment arrangement.
Figure 7:
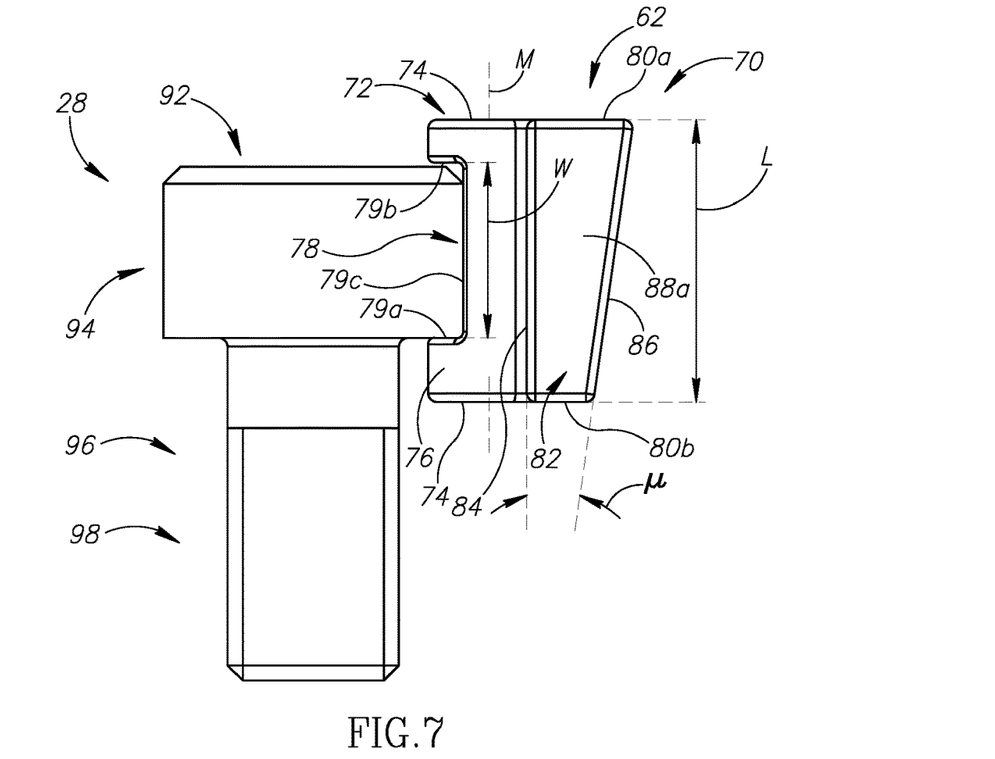
FIG. 7 is a plan view of the adjustment arrangement shown in FIG. 6, with a screw head located in an actuating groove.
Figure 8:
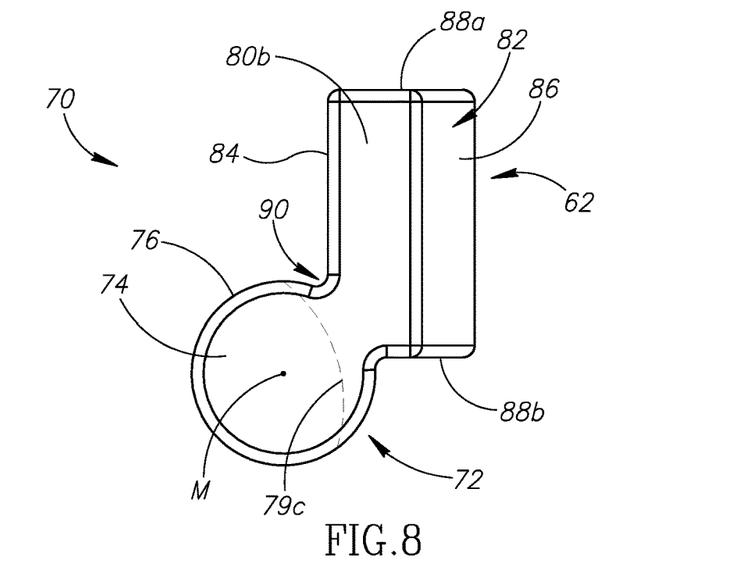
FIG. 8 is an end view of an adjustment member of the adjustment arrangement shown in FIG. 6.

Referring now to FIGS. 6-8, the adjustment arrangement 28 includes an adjustment member 70. The adjustment member 70 includes the wedge adjustment portion 62 and a guiding portion 72. The guiding portion 72 is integrally formed with the wedge adjustment portion 62. That is to say, the adjustment member 70 is of unitary, one-piece construction. The adjustment member 70 can be typically made from a metal, such as steel. Moreover, the adjustment member 70 can be manufactured by an Additive Manufacturing process (e.g., "3D-printed") and therefore comprises an additively manufactured metallic unit. As is known to those skilled in the art, a metal object made by additive manufacturing differs in certain physical characteristics from a metal object made of the same material, but formed by casting optionally followed by milling.

In accordance with some embodiments of the subject matter of the present application, the guiding portion 72 can include two opposing guiding portion end surfaces 74 and a guiding portion peripheral surface 76 that extends between the two guiding portion end surfaces 74. The guiding portion peripheral surface 76 can extend circumferentially along an adjustment arrangement major axis M that can intersect the two guiding portion end surfaces 74. The adjustment arrangement major axis M can be co-incident with the guiding bore portion axis G when the adjustment member 70 is assembled to the tool holder 22.

Making reference to FIG. 7, the guiding portion 72 includes an actuating groove 78. In accordance with some embodiments of the subject matter of the present application, the actuating groove 78 can be recessed in the guiding portion peripheral surface 76. The actuating groove 78 can include two first and second groove side surfaces 79a, 79b, which face each other and are spaced apart from one another by a groove central surface 79c. As seen in FIG. 8, the groove central surface 79c (shown as a dashed line) can be concavely curved. In particular, the actuating groove 78 can be arc-shaped. As measured in the direction of the adjustment arrangement major axis M, the groove width W of the actuating groove 78 can be greater than 50% of the guiding portion length L of the guiding portion 72. In a plane, perpendicular to the adjustment arrangement major axis M taken through the guiding portion peripheral surface 76 upon which the actuating groove 78 is not located (i.e. a non-central portion), the guiding portion 72 can have a constant cross-section along the adjustment arrangement major axis M. Said cross-section can be circular. Thus, the guiding portion 72 can have a shape corresponding shape to the guiding bore portion 66, where the radial dimension of the guiding bore portion 66 can be slightly larger than the radial dimension of the guiding portion 72 so that no inference fit is formed when the guiding portion 72 is displaced within the guiding bore portion 66. Stated differently, the guiding portion 72 is configured to slide within the guiding bore portion 66.

In accordance with some embodiments of the subject matter of the present application, the wedge adjustment portion 62 can include two opposing wedge end surfaces 80a, 80b and a wedge peripheral surface 82 that extends therebetween. The wedge peripheral surface 82 can include opposing wedge rear and forward contact surfaces 84, 86, and opposing a wedge top and bottom surfaces 88a, 88b. The wedge top surface 88a can connect the wedge rear and front contact surfaces 84, 86. The wedge rear contact surface 84 can connect the wedge top surface 88a and the guiding portion peripheral surface 76. Likewise, the wedge bottom surface 88b can connect the wedge front contact surface 86 and the guiding portion peripheral surface 76.

As seen in FIG. 7, in accordance with some embodiments of the subject matter of the present application, the wedge front contact surface 86 can be planar. Similarly, the wedge rear contact surface 84 can be planar. The wedge front contact surface 86 and the wedge rear contact surface 84 can be non-parallel. Stated differently they can taper towards each other at an acute wedge angle μ.

As seen in FIG. 8, the wedge adjustment portion 62 can be integrally formed with the guiding portion 72 at a guiding neck portion 90 that can be narrower than the guiding portion 72. Advantageously, by virtue of said guiding neck portion 90 the adjustment member 70 remains attached to the tool holder 22 during indexing or replacement of the cutting member 24.

Referring to FIG. 4, the wedge front contact surface 86 faces towards the pocket opening 52. The wedge rear contact surface 84 faces away from the pocket opening 52. The wedge front contact surface 86 and the wedge rear contact surface 84 can taper towards each other in a direction away from whichever one of the holder peripheral surface 50 and holder face surface 48 the pocket opening 52 does not open out to. Thus, for axial adjustment of the cutting member 24 the wedge front contact surface 86 and the wedge rear contact surface 84 taper away from the holder peripheral surface 50. The wedge front contact surface 86 can be perpendicular to the holder central axis B. Thus, the wedge rear contact surface 84 can extend obliquely to the holder central axis B.

The adjustment arrangement 28 includes an adjustment screw 92. The adjustment screw 92 includes an adjustment screw head 94 and a screw shank portion 96 that extends away therefrom. The screw shank portion 96 includes an external threaded portion 98. The adjustment screw head 94 has a greater radial dimension than the screw shank portion 96. In accordance with some embodiments of the subject matter of the present application, the adjustment screw head 94 can be located at one end of the adjustment screw 92. The adjustment screw 92 can be a standard screw, e.g. an ISO standard screw.

To assemble the tool holder 22 (i.e. attach the adjustment arrangement 28 to the tool holder 22) the following steps can be performed. The adjustment screw head 94 is placed in the actuating groove 78. Simultaneously, the guiding portion 72 is inserted into the guiding bore portion 66 and the adjustment screw 92 (by being rotated) is inserted into the threaded bore portion 64. During this step the wedge adjustment portion 62 enters the pocket adjustment region 54. The external threaded portion 98 is then threadingly received in the threaded portion 64a. At the end of said assembly, the guiding portion 72 is located in the guiding recess 66 and partially protrudes into the threaded bore portion 64 so that the actuating groove 78 is located in the threaded bore portion 64 with the adjustment screw head 94 located in the actuating groove 78. The wedge adjustment portion 62 is located in the pocket adjustment region 54.

As discussed, one aspect of the subject matter of the present application includes the cutting tool 20, having the tool holder 22 and the cutting member 24 releasably attached thereto. The cutting tool 20 is adjustable between a loosely fastened position and a fully fastened position. In the loosely fastened position, the cutting member 24 is releasably retained in the holder pocket 26. In accordance with some embodiments of the subject matter of the present application such fixation of the cutting member 24 is achieved by a retaining screw 100 located in the cutting member through bore 46 and threadingly received in the pocket threaded bore 59. The retaining screw 100 is only loosely tightened so that the cutting member 24 can have some freedom to move. The retaining screw 100 is then fully tightened to attain the fully fastened position. Referring now to FIGS. 4 and 5, in the fully fastened position of the cutting tool 20 the cutting member bearing surface 44 abuts the wedge front contact surface 86. The pocket support surface 60 abuts the wedge rear contact surface 84.

Adjustment of the adjustment arrangement 28 can be performed when the cutting tool 20 is in either the loosely fastened or fully fastened position. If the adjustment is performed when the cutting tool 20 is in a loosely fastened position, then after adjustment is performed the additional steps to attain the fully fastened position of the cutting tool 20 should be performed.

Adjustment of the adjustment arrangement 28 is accomplished by performing the following steps. The adjustment screw 92 is threadingly rotated in a first rotational direction RD1 about the threaded bore portion axis T to a first rotated position. During such a rotation of the adjustment screw 92 the adjustment screw head 94 contacts the first groove side surface 79a of the actuating groove 78 and urges the adjustment member 70 to be displaced in a first guiding direction GD1. The adjustment screw 92 is threadingly rotated in a second rotational direction RD2, which is rotationally opposite to the first rotational direction RD1, to a second rotated position. During such a rotation of the adjustment screw 92 the adjustment screw head 94 contacts a second groove side 79b of the actuating groove 78 and urges the adjustment member 70 to be displaced in the second guiding direction GD2. During displacement of the adjustment member 70 in each guiding direction GD1, GD2 the wedge rear and front contact surfaces 84, 86 slide over the pocket support surface 60 and cutting member bearing surface 44, respectively.

Figure 9:
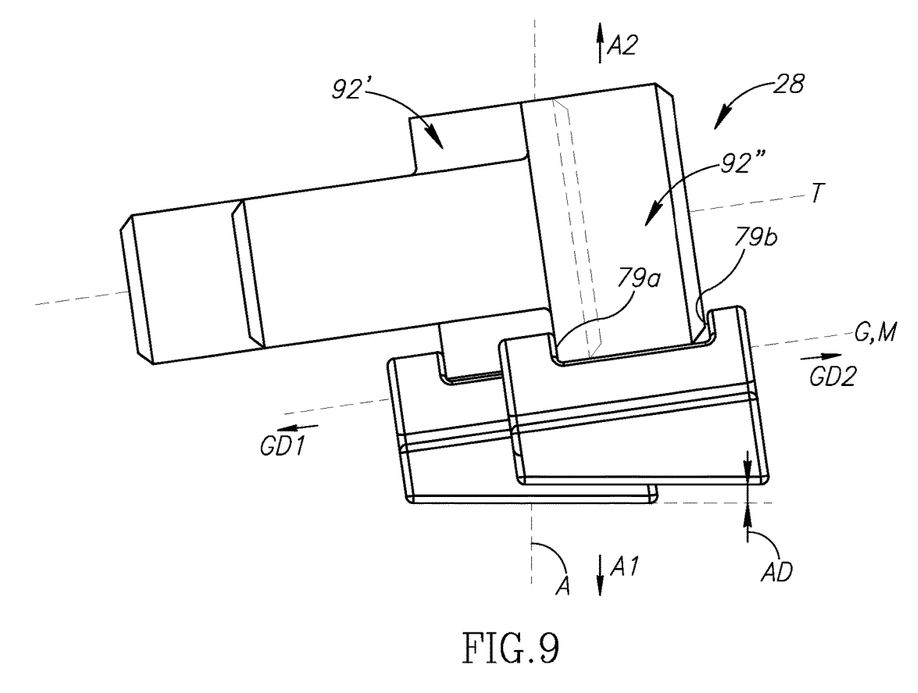
FIG. 9 is a schematic view of two superimposed adjustment arrangements showing relative positioning when the adjustment screw is in a first and second rotated position respectively.

FIG. 9 shows a schematic view of two superimposed adjustment arrangements showing relative positioning when the adjustment screw 92 is in a first and second rotated position respectively, where 92' denotes the adjustment screw in the first position and 92" denotes the adjustment screw in the second position. As seen in such a view, in the first rotated position the adjustment member 70 is offset by an adjustment distance AD in the first adjustment direction A1 as compared to when it is in the second rotated position. Thus, in the first rotated position the adjustment member 70 is located closer to the pocket opening 52 than when in the second rotated position. It is appreciated that the non-threaded screw head portion 64b is longer than the screw head 94 (as measured in the direction of the threaded bore portion axis T). This allows the adjustment screw 92 to be threadingly rotated between the first rotated position and the second rotated position without the screw head 94 being impeded.

It is noted that the adjustment member 70 described above can be easily and cheaply manufactured by an Additive Manufacturing process (e.g., "3D-printed") compared with other standard manufacturing techniques known in the art such as milling.

It is yet further noted that in a cutting tool 20 having the above-described adjustment arrangement 28, no cutting forces are applied on the adjustment screw 92 during cutting operations.

Although the subject matter of the present application has been described to a certain degree of particularity, it should be understood that various alterations and modifications could be made without departing from the spirit or scope of the invention as hereinafter claimed. For example, the cutting member 24 can include the cutting insert 30 retained in a cartridge pocket of an insert cartridge.

What is claimed is:

1. A tool holder (22), having a holder central axis (B) defining opposite forward and rearward directions ($D_F$, $D_R$), the tool holder (22) comprising:
   a holder face surface (48) and a holder peripheral surface (50) extending rearwardly and circumferentially along the holder central axis (B) from the holder face surface (48);
   a holder pocket (26) recessed in the tool holder (22) and comprising a pocket opening (52) which opens out to one of the holder peripheral surface (50) and holder face surface (48), and further comprising a pocket adjustment region (54) located at an opposing end of holder pocket (26) to the pocket opening (52); and
   an adjustment cavity (63), recessed in and opening out to whichever one of the holder peripheral surface (50) and holder face surface (48) the pocket opening (52) does not open out to, the adjustment cavity (63) comprising circumferentially merging threaded and guiding bore portions (64, 66), the guiding bore portion (66) adjoining the pocket adjustment region (54).

2. The tool holder (22), according to claim 1, further comprising:
   an adjustment arrangement (28) comprising:
      an adjustment member (70) comprising a wedge adjustment portion (62) and a guiding portion (72) integrally formed therewith, the guiding portion (72) comprising an actuating groove (78); and
      an adjustment screw (92) comprising an adjustment screw head (94); wherein
      the wedge adjustment portion (62) is located in the pocket adjustment region (54);
      the guiding portion (72) is located in the guiding bore portion (66) and partially protrudes into the threaded bore portion (64) so that the actuating groove (78) is located therein;
      the adjustment screw (92) is threadingly received in the threaded bore portion (64);
      the adjustment screw head (94) is located in the actuating groove (78); and
      the adjustment screw (92) is threadingly rotatable between a first rotated position and a second rotated position, and in the first rotated position the adjustment member (70) is located closer to the pocket opening (52) than in the second rotated position.

3. The tool holder (22), according to claim 2, wherein:
   the guiding portion (72) comprises two opposing guiding portion end surfaces (74) and a guiding portion peripheral surface (76) extending therebetween;
   the guiding portion peripheral surface (76) extends circumferentially along an adjustment arrangement major axis (M) that intersects the two guiding portion end surfaces (74); and
   the actuating groove (78) is recessed in the guiding portion peripheral surface (76).

4. The tool holder (22), according to claim 3, wherein the actuating groove (78) comprises first and second groove side surfaces (79a, 79b) which face each other and are spaced apart by a concavely curved groove central surface (79c).

5. The tool holder (22), according to claim 3, wherein, as measured in the direction of the adjustment arrangement major axis (M), a groove width (W) of the actuating groove (78) is greater than 50% of a guiding portion length (L) of the guiding portion (72).

6. The tool holder (22), according to claim 3, wherein the guiding portion (72) has a shape that corresponds to the guiding bore portion (66).

7. The tool holder (22), according to claim 3, wherein:
   the wedge adjustment portion (62) comprises two opposing wedge end surfaces (80a, 80b) and a wedge peripheral surface (82) extending therebetween, the wedge peripheral surface (82) comprising:
   opposing wedge rear and forward contact surfaces (84, 86), and opposing a wedge top and bottom surfaces (88a, 88b), wherein:
      the wedge top surface (88a) connects the wedge rear and front contact surfaces (84, 86);
      the wedge rear contact surface (84) connects the wedge top surface (88a) and the guiding portion peripheral surface (76); and
      the wedge bottom surface (88b) connects the wedge front contact surface (86) and the guiding portion peripheral surface (76).

8. The tool holder (22), according to claim 7, wherein the wedge adjustment portion (62) is integrally formed with the guiding portion (72) at a guiding neck portion (90) that is narrower than the guiding portion (72).

9. The tool holder (22), according to claim 7, wherein the wedge front contact surface (86) faces towards the pocket opening (52), is planar and is perpendicular to the holder central axis (B).

10. The tool holder (22), according to claim 7, wherein the wedge front contact surface (86) and the wedge rear contact surface (84) taper towards each other at an acute wedge angle ($\mu$).

11. The tool holder (22), according to claim 10, wherein the wedge front contact surface (86) and the wedge rear contact surface (84) taper towards each other in a direction away from whichever one of the holder peripheral surface (50) and holder face surface (48) the pocket opening (52) does not open out to.

12. The tool holder (22), according to claim 2, wherein the adjustment member (70) comprises an additively manufactured metallic unit.

13. The tool holder (22), according to claim 1, wherein:
   the guiding bore portion (66) extends along a guiding bore portion axis (G);
   the threaded bore portion (64) extends along a threaded bore portion axis (T); and
   the guiding bore portion axis (G) is parallel to the threaded bore portion axis (T) and spaced apart therefrom.

14. The tool holder (22) according to claim 13, wherein:
the holder pocket (26) comprises a pocket base surface (56), and a pocket peripheral surface (58) oriented substantially perpendicularly thereto and forming a partial boundary thereof; and
the pocket peripheral surface (58) comprises a pocket support surface (60) that is planar and parallel to the guiding bore portion axis (G).

15. The tool holder (22), according to claim 14, wherein:
the guiding bore portion (66) comprises a guiding bore portion peripheral surface (68) that extends circumferentially along the guiding bore portion axis (G);
the guiding bore portion peripheral surface (68) extends to a support edge (60a) of the pocket support surface (60); and
the guiding bore portion peripheral surface (68) extends to a base edge (56a) of the pocket base surface (56).

16. The tool holder (22), according to claim 13, wherein:
the holder pocket (26) has an adjustment axis (A) that extends through the pocket adjustment region (54) and the pocket opening (52), defining opposite first and second adjustment direction (A1, A2); and
in a view perpendicular to a pocket median plane (PP), the guiding bore portion axis (G) is oriented obliquely with respect to the adjustment axis (A).

17. The tool holder (22), according to claim 16, wherein the guiding bore portion axis (G) and the adjustment axis (A) form an obtuse guiding angle (α), the guiding angle (α) being measured through the holder pocket (26).

18. The tool holder (22), according to claim 16, wherein in a view perpendicular to the pocket median plane (PP), the adjustment axis (A) is parallel to the holder central axis (B).

19. The tool holder (22), according to claim 16, wherein in a plane perpendicular to the guiding bore portion axis (G), the guiding bore portion (66) has a constant guiding bore cross-section along the guiding bore portion axis (G).

20. The tool holder (22), according to claim 19, wherein guiding bore cross-section is circular.

21. The tool holder (22) according to claim 1, wherein:
the pocket opening (52) opens out to the holder face surface (48); and
the adjustment cavity (63) is recessed in and opens out to the holder peripheral surface (50).

22. The tool holder (22) according to claim 21, wherein the holder pocket (26) is located at a forward end of the tool holder (22).

23. A cutting tool (20) comprising:
a tool holder (22) in accordance with claim 1; and
a cutting member (24) releasably retained in the holder pocket (26).

24. The cutting tool (20), according to claim 23, wherein:
the cutting member (24) comprises a cutting member through bore (46);
the holder pocket (26) comprises a pocket threaded bore (59) recessed in and opening out to the pocket base surface (56); and
the cutting member (24) is releasably retained in the holder pocket (26) by a retaining screw (100) located in the cutting member through bore (46) and threadingly received in the pocket threaded bore (59).

25. The cutting tool (20), according to claim 23, wherein:
the wedge adjustment portion (62) comprises two opposing wedge end surfaces (80a, 80b) and a wedge peripheral surface (82) extending therebetween, the wedge peripheral surface (82) comprising:
opposing wedge rear and forward contact surfaces (84, 86), and opposing a wedge top and bottom surfaces (88a, 88b), wherein:
the wedge top surface (88a) connects the wedge rear and front contact surfaces (84, 86);
the wedge rear contact surface (84) connects the wedge top surface (88a) and a guiding portion peripheral surface (76) of the guiding portion (72);
the wedge bottom surface (88b) connects the wedge front contact surface (86) and the guiding portion peripheral surface (76);
the cutting member (24) comprises a cutting edge (42) and a cutting member bearing surface (44) opposite the cutting edge (42); and
the cutting member bearing surface (44) abuts the wedge front contact surface (86).

26. The cutting tool (20), according to claim 25, wherein:
the holder pocket (26) comprises a pocket base surface (56), and a pocket peripheral surface (58) oriented substantially perpendicularly thereto and forming a partial boundary thereof;
the pocket peripheral surface (58) comprises a pocket support surface (60) that is planar and parallel to the guiding bore portion axis (G); and
the pocket support surface (60) abuts the wedge rear contact surface (84).

27. The cutting tool (20), according to claim 23, wherein the cutting member (24) consists of an integral cutting insert (30).

28. The cutting tool (20), according to claim 23, wherein the cutting tool (20) is rotatable about the tool central axis (A) in a rotational direction (R).

* * * * *